(12) United States Patent
Farley et al.

(10) Patent No.: US 9,858,527 B1
(45) Date of Patent: Jan. 2, 2018

(54) ALGORITHMIC METHOD FOR MODELING HUMAN DECISION-MAKING

(71) Applicants: Stephen M. Farley, Sterling, VA (US); Jerry Rosson Smith, Jr., Springfield, VA (US)

(72) Inventors: Stephen M. Farley, Sterling, VA (US); Jerry Rosson Smith, Jr., Springfield, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 238 days.

(21) Appl. No.: 14/192,093

(22) Filed: Feb. 27, 2014

Related U.S. Application Data

(60) Provisional application No. 61/832,247, filed on Jun. 7, 2013.

(51) Int. Cl.
*G06F 17/00* (2006.01)
*G06N 5/02* (2006.01)
*G06N 5/04* (2006.01)

(52) U.S. Cl.
CPC ..................................... *G06N 5/04* (2013.01)

(58) Field of Classification Search
USPC .......................................................... 706/47
See application file for complete search history.

(56) References Cited

U.S. PATENT DOCUMENTS

| | | |
|---|---|---|
| 5,045,860 A | 9/1991 | Hodson |
| 5,191,342 A | 3/1993 | Alsup et al. |
| 6,631,362 B1 | 10/2003 | Ullman et al. |

(Continued)

OTHER PUBLICATIONS

Patrick Beaumont, "Multi-Platform Coordination and Resource Management in Command and Control", M.Sc Thesis published by Faculte Des Sciences et De Genie, Universite Laval, Quebec, CA, Aug. 2004, pp. 1-155.*

(Continued)

*Primary Examiner* — Michael B Holmes
(74) *Attorney, Agent, or Firm* — Howard Kaiser

(57) ABSTRACT

Exemplary practice of this invention implements a computer to model human decision-making within a comprehensive human-perception construct dichotomized as probabilistically perceptual and preferentially perceptual. Potential actions are identified. Each identified potential action is evaluated in consideration of (i) probabilities of success as perceived by the decision-maker, and (ii) preferences of the decision-maker relating to consistency, credibility, confidence, bias, and urgency. Decision-making is modeled on a continual basis whereby evaluation of at least one potential action is performed anew in each successive time-step. Evaluations of potential actions yield "goodness" values, which are compared to determine best potential actions. Threshold "goodness" parameters are established to filter out some potential actions and leave other potential actions for goodness comparison. The best potential action of a particular time-step is compared to the best potential action of the preceding time-step in order to decide whether to maintain or change the existing course of action.

6 Claims, 10 Drawing Sheets

(56) References Cited

U.S. PATENT DOCUMENTS

| | | | | |
|---|---|---|---|---|
| 7,026,981 | B1* | 4/2006 | Smith, Jr. | G01S 7/02 342/108 |
| 7,138,941 | B1* | 11/2006 | Smith, Jr. | G01S 7/4004 342/125 |
| 7,161,529 | B1* | 1/2007 | Smith, Jr. | G01S 7/292 342/108 |
| 7,557,747 | B1* | 7/2009 | Smith, Jr. | G01S 7/024 342/444 |
| 8,093,908 | B1* | 1/2012 | Smith, Jr. | G01R 27/22 324/600 |
| 8,102,306 | B2* | 1/2012 | Smith, Jr. | G01S 13/867 342/146 |
| 8,113,072 | B1* | 2/2012 | Smith, Jr. | G01R 33/0064 73/866.4 |
| 8,350,765 | B2* | 1/2013 | Smith, Jr. | G01R 35/005 343/703 |
| 9,524,358 | B1* | 12/2016 | Rutkowski | G06F 17/5009 |
| 2006/0184291 | A1* | 8/2006 | Paradis | G05D 1/0088 701/23 |
| 2011/0279303 | A1* | 11/2011 | Smith, Jr. | G01S 13/89 342/52 |
| 2011/0279334 | A1* | 11/2011 | Smith, Jr. | G01R 35/005 343/703 |

OTHER PUBLICATIONS

Ola Leifler, "Affordances and Constraints of Intelligent Decision Support for Military Command and Control—Three Case Studies of Support Systems", phd thesis published by Human-Centered Systems, Department of Computer and Information Science, Linkoping University, SE-581 85 Linkoping, Sweden, 2011, pp. 1-134.*

Richard M. Gomez, "Centralized Command—Decentralized Execution: Implecations of Operating in a Network Centric Warfare Environment", Theis published by Air War College, Air University, Maxwell Air Force Base, Alabama, 2003, pp. 1-34.*

Gabriela Prelipcean and Mircea Boscoianu, "Emerging Applications of Decision Support Systems (DSS) in Crisis Management", chapter 18 in book: Chiang Jao, Ed., "Efficient Decision Support Systems—Practice and Challenges in Multidisciplinary Domains", InTech, 2011, pp. 360-376.*

Tina Erlandsson, "Situation Analysis for Fighter Aircraft Combat Survivability". phd thesis published by Studies from the School of Science and Technology at Orebro University, University of Skovde, 23, Orebro, SA, 2011, pp. 1-144.*

Duane A. Gilmour, James P. Hanna, William E. McKeever & Martin J. Walter, "Real-time Course of Action Analysis", Report AFRL-IF-RS-TP-2006-6, published by AFRL/IFTC, 525 Brooks Road, Rome NY 13441-4505, Jul. 2006, pp. 1-13.*

Optimize the spectrum sensing and decision making strategies under uncertainty for SATCOM Wenqi Liu; Hongxiang Li; Sanjuli Agarwal; Bin Xie Milcom 2016—2016 IEEE Military Communications Conference Year: 2016 pp. 168-173 IEEE Conference Publications.*

Algorithm of ASDP Based on Heterogeneous Sensors Xiaoyong Wu; Gang Liu; Tao Jing 2011 Fourth International Symposium on Computational Intelligence and Design Year: 2011, vol. 1 pp. 89-92 IEEE Conference Publications.*

ERDT: Energy-Efficient Reliable Decision Transmission for Intelligent Cooperative Spectrum Sensing in Industrial IoT Rongbo Zhu; Xue Zhang; Xiaozhu Liu; Wanneng Shu; Tengyue Mao; Brian Jalaian IEEE Access Year: 2015, vol. 3 pp. 2366-2378 IEEE Journals & Magazines.*

Coverage control of mobile sensors for adaptive search of unknown Number of targets Amit Surana; George Mathew; Suresh Kannan 2012 IEEE International Conference on Robotics and Automation Year: 2012 pp. 663-670 IEEE Conference Publications.*

Stephen M. Farley and Jerry Rosson Smith, Jr., "A Framework for Analyzing Decision-Making in Complex Military Environments," face-dated Mar. 19, 2011, 44 pages, submitted on or about Mar. 19, 2011 as a Final Project for the Master of Systems Analysis (MSA) degree program in the Graduate School of Operational and Information Sciences (GSOIS) of the Naval Postgraduate School (NPS); unpublished document, included as Appendix A in U.S. Appl. No. 61/832,247.

Stephen M. Farley and Jerry Rosson Smith, Jr., "A Framework for Analyzing Decision-Making in Complex Military Environments: A General Modeling Approach to the Collection, Processing, and Use of Information in Decision Making and Influencing Organizations," face-dated Mar. 17, 2011, 37 slides, presented at the 80th Military Operations Research Symposium (MORS), Jun. 11-14, 2012, at the U.S. Air Force Academy; included as Appendix B in U.S. Appl. No. 61/832,247.

U.S. Appl. No. 61/832,247, filed Jun. 7, 2013, title "Factors, Algorithms, and Constructs for Modeling of Human Decision-Making," inventors Stephen M. Farley and Jerry Rosson Smith, Jr.

* cited by examiner

ALGORITHMIC METHOD FOR MODELING HUMAN DECISION-MAKING

CROSS-REFERENCE TO RELATED APPLICATIONS

This application claims the benefit of U.S. provisional application Ser. No. 61/832,247, incorporated herein by reference, filing date 7 Jun. 2013, title "Factors, Algorithms, and Constructs for Modeling of Human Decision-Making," inventors Stephen M. Farley and Jerry Rosson Smith, Jr.

BACKGROUND OF THE INVENTION

The present invention relates to computer modeling and simulation, more particularly to computer modeling and simulation representative of human decision-making.

It has been a long-standing challenge in warfare mission modeling to represent the decision-making ability of commanders in the field. Warfare commanders are confronted with continuous streams of information, and they act on their understanding of information in light of their objectives, capabilities and strategy. A key facet of the tactical decision making process of commanders is dealing with the myriad timelines, resources and opportunities in warfare.

Various quantitative decision-making algorithms (e.g., match filters, Kalmann filters, etc.) are known that seek to determine the optimal assignments of target classifications. Nevertheless, human decision-makers do not always make optimal decisions. Conventional approaches to representing human decision-making often use weighted factor trees, Bayesian networks, or "if-then-else" logic rules; however, these methods have high data requirements (experimental or subject matter expert), and generally require the modeler to fully articulate a wide range of possible conditions.

Furthermore, most human decision-making algorithms cannot represent decision-maker biases, either static or evolving. In addition, most conventional human decision-making algorithms cannot represent urgency at any given decision point or towards any particular decision option.

SUMMARY OF THE INVENTION

In view of the foregoing, an object of the present invention is to provide a better computer modeling and simulation (M&S) methodology for representing decision-making by people.

According to exemplary practice of the present invention, a human decision-maker identifies at least one potential action to be decided upon by the decision-maker. Each potential action is evaluated by the decision-maker in a perceptual framework of the decision-maker. The components of the decision-maker's perceptual framework include: (a) a probability of success of the potential action as perceived by the decision-maker; and, (b) a preference of the decision-maker with respect to the potential action. The preference of the decision-maker is influenced by factors including: (i) an urgency to perform the potential action as perceived by the decision-maker; (ii) a bias of the decision-maker with respect to the potential action; and, (iii) a confidence of the decision-maker with respect to the potential action. The confidence of the decision-maker is based on a comparison of a credibility of the potential action versus a credibility of a different potential action. The credibility is based on a historical consistency of the corresponding potential action. The urgency includes temporal urgency, resource urgency, and opportunity urgency. The evaluating of a potential action includes computing a goodness magnitude of the potential action. A best potential action can be selected from among two or more potential actions, based on the respective goodness magnitudes of the potential actions.

The present invention provides an analytical framework that represents how an individual decision-maker's internal cognitive elements and behaviors are influenced by his/her perceptions as well as his/her personality. The various aspects of the present invention include its objectives, perceptions, abilities, limitations, and strategies ("OPALS") aspect, its consistency-credibility-confidence aspect, its bias (including inclination and expectation) aspect, and its urgency aspect.

According to a first inventive aspect, taken into consideration are a human decision-maker's objectives, perceptions, abilities, limitations, and strategies. The present invention's "OPALS" (Objectives, Perceptions, Abilities, Limitations, and Strategies) construct can be applied, for instance, to tactical decision-making.

According to a second inventive aspect, taken into consideration are consistency, credibility, and confidence as associated with identification and classification of information by a human decision-maker. The present invention's "Consistency, Credibility, and Confidence" methodology affords a quantitative model of human decision-making capable of evaluating inconsistent, incorrect, and false sequential reports of proposed subject classification, and of arriving at a viable classification of assignments.

According to a third inventive aspect, personal subjectivity factors (e.g., biases and expectations) of a human decision-maker are taken into consideration. The present invention's "Bias and Expectation" methodology affords a quantitative model of human decision-making capable of accounting for diverse forms of decision-maker bias, such as bias toward or against expectations or sources of information, or bias learned through experience.

According to a fourth inventive aspect, urgency factors relating to human decision-making are taken into consideration. The present invention's quantitative model of human decision-making can account for urgency factors associated with timing or the decision-maker's evolving perceptions of the decision space. The present invention can efficiently and explicitly represent urgency in decision-making, based on expected future states, conditions, or lost opportunities that all may impact future outcome successes.

Exemplary practice of the present invention generates and evaluates a leader's command options. This information can be used in any application that requires decision-making in a time-stepped environment, such as an analytical model, a tactical decision aid, or a training simulator. The inventive methodology provides a framework for a decision-maker with known objectives who is seeking to prioritize potential actions. Leaders select actions in real-time based on their perceptions of the environment and their capabilities, the urgency to act in order to meet their objectives, and their desire to avoid negative consequences. Given a leader's objectives, abilities, limitations, strategy, and potential actions, the present invention's framework builds decision-quality perceptions and scores the urgency/urgencies of choices in order to maximize success.

Although the terms "model" and "simulation" have occasionally been distinguished from each other in technical usage, these terms are used interchangeably herein to broadly refer to representation of a thing or system of things, such as representation of characteristics and behaviors of human decision-makers. An inventive algorithm may be coded in practically any computer programming language.

The present invention can be practiced to model human decision-making of practically any kind, and can be embodied, for instance, as a computer-implemented method, a system or apparatus including a computer, or a computer program product. Usual inventive practice implements a computer and a computer display to facilitate modeling of human decision-making, the computer including a processor and memory/storage, both volatile and non-volatile.

Pertinent to the instant disclosure is the following paper co-authored by the present inventors: Stephen M. Farley and Jerry Rosson Smith, Jr., "A Framework for Analyzing Decision-Making in Complex Military Environments," face-dated 19 Mar. 2011, 44 pages, submitted on or about 19 Mar. 2011 as a Final Project for the Master of Systems Analysis (MSA) degree program in the Graduate School of Operational and Information Sciences (GSOIS) of the Naval Postgraduate School (NPS). The paper is internal to the Navy and is not published.

Also pertinent to the instant disclosure is the following slide presentation presented by the present inventors: Stephen M. Farley and Jerry Rosson Smith, Jr.," "A Framework for Analyzing Decision-Making in Complex Military Environments: A General Modeling Approach to the Collection, Processing, and Use of Information in Decision Making and Influencing Organizations," face-dated 17 Mar. 2011, 37 slides, presented at the 80th Military Operations Research Symposium (MORS), 11-14 Jun. 2012, at the U.S. Air Force Academy.

BRIEF DESCRIPTION OF THE DRAWINGS

The present invention will now be described, by way of example, with reference to the accompanying drawings, wherein.

DESCRIPTION OF EXEMPLARY
EMBODIMENTS OF THE INVENTION

Figure 1:
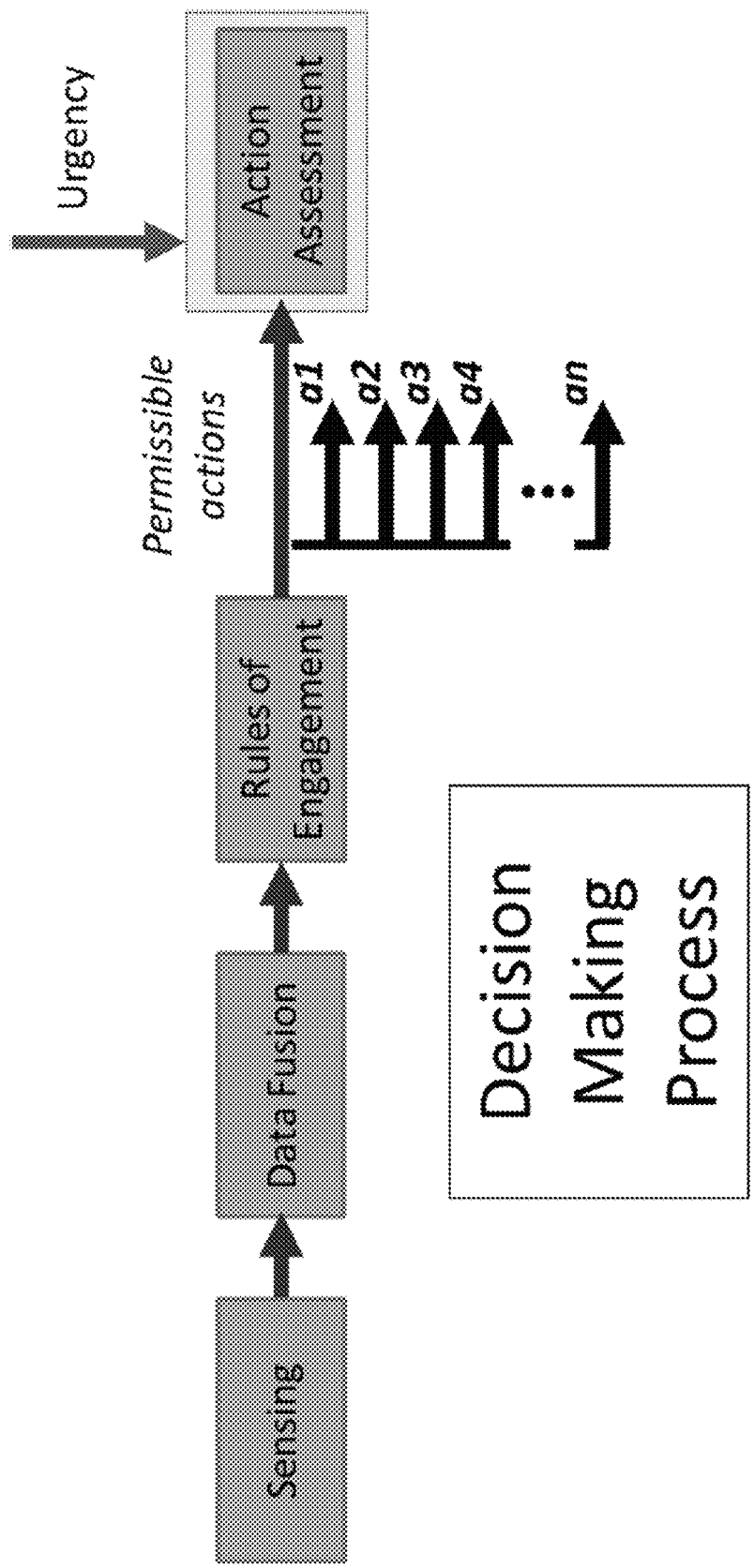
FIG. 1 is a diagram illustrating an example of a decision-making process in accordance with the present invention.

Referring now to the figures, FIG. 1 depicts an example of the overall decision-making process of the present invention. As shown in FIG. 1, a network of sensors reports to a data fusion center, in which detection reports are compiled and processed. Continuously or periodically through the simulation, a fused summary report of the sensors is then produced and evaluated in light of the governing rules of engagement. The rules of engagement will generate and filter a number of appropriate new actions $(a_1, a_2, \ldots a_n)$ that may be taken by a commander. These potential actions will then be assessed for the best action to be taken for that time step. Each step is discussed hereinbelow.

Figure 2:
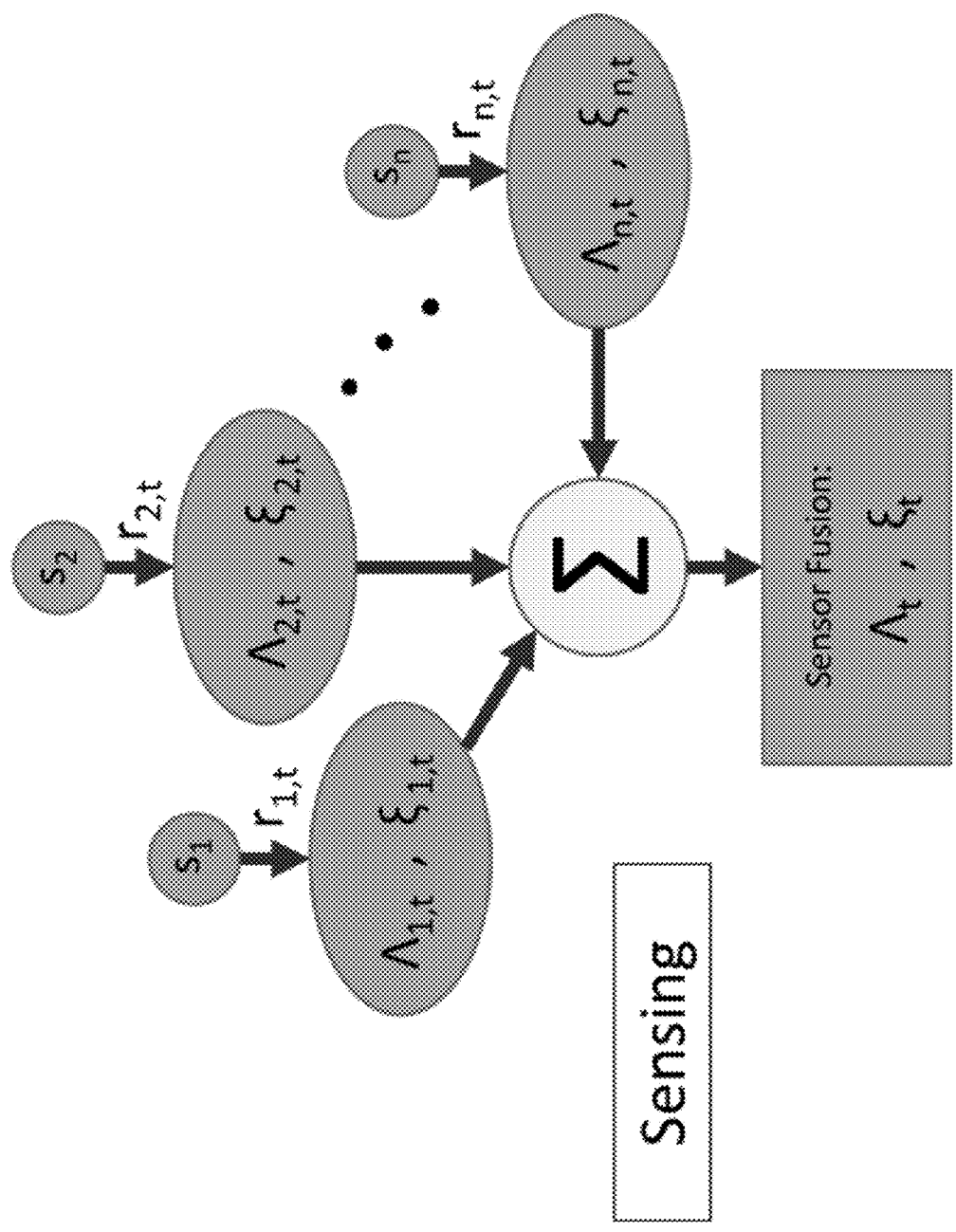
FIG. 2 is a diagram illustrating an example of sensor network data fusion in accordance with the present invention.

Consider a network of sensors $(S_1, S_2, S_3, \ldots S_n)$ that are independently sending reports $(r_{1t}, r_{2t}, r_{3t}, \ldots r_{nt})$ either continuously or periodically at times t. Each report contains two data elements: a determination of what has been detected, $\lambda_{st}$; and, a confidence estimate $(\xi_{st})$ based on the quality of the data stream over time. FIG. 2 depicts this activity. As shown in FIG. 2, these temporal reports for the sensor network are fused in a process that calculates one summative report of $\lambda_t$ with its associated confidence level, $\xi_t$.

Further enhancements to this inventive process may include features such as time-weighting data in order to increase the relative value of newer data. Additionally, sensors could be biased in order to increase the influence of sensors with higher quality or higher confidence in the fusion process. This sensing process would need to be completed for all groups of sensors for a mission model. The analyst building the simulation would determine the groupings of the sensor fusion stages for model accuracy.

Figure 3:
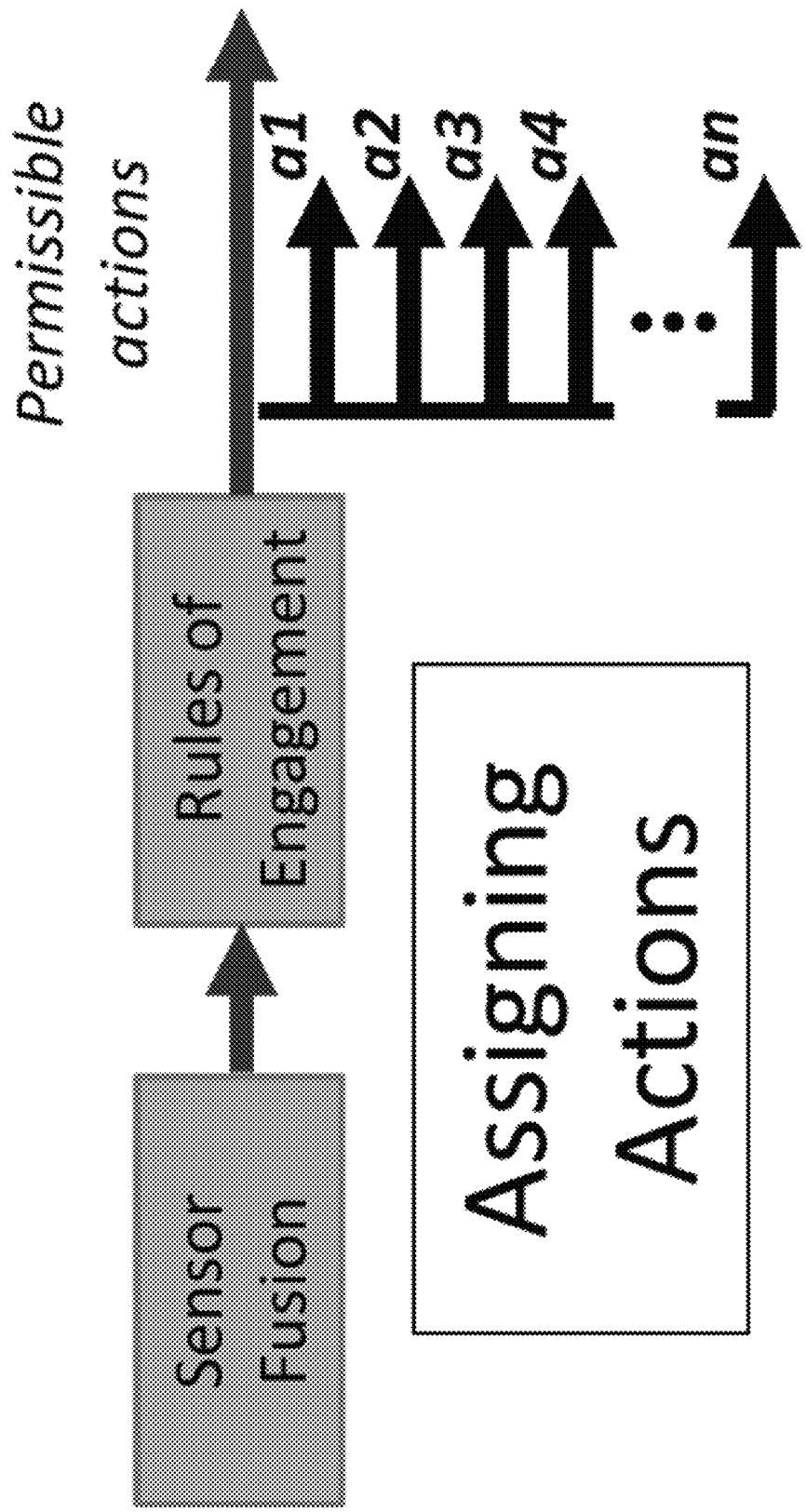
FIG. 3 is a diagram illustrating an example of how sensor data stimulates permissible actions in accordance with the present invention.

FIG. 3 shows an example of the present invention's use of these temporal fused sensor reports to stimulate commander actions through the modeled rules of engagement (ROEs). The ROE function creates permissible actions as their acceptability criteria are met. For instance, an inbound ASCM threat with high confidence would likely stimulate immediate defensive actions for a surface ship.

The term "action," as defined herein, includes all of the related tasks or sub-actions, occurring all at once or over a period of time, that would be undertaken to achieve the desired effect. The terms "action" and "course of action" are used interchangeably herein. An action can be the same as, or similar to, or significantly differ from, a previous action undertaken to achieve the desired effect. An action can involve a mere maintaining of the status quo. The ROE function therefore de-conflicts mutually exclusive sub-actions, or sub-actions dependent on sub-actions not yet taken. The "permissible actions" shown in FIG. 3 are separate and distinct courses of action that could be taken by the decision-maker at that point in time.

Figure 4:
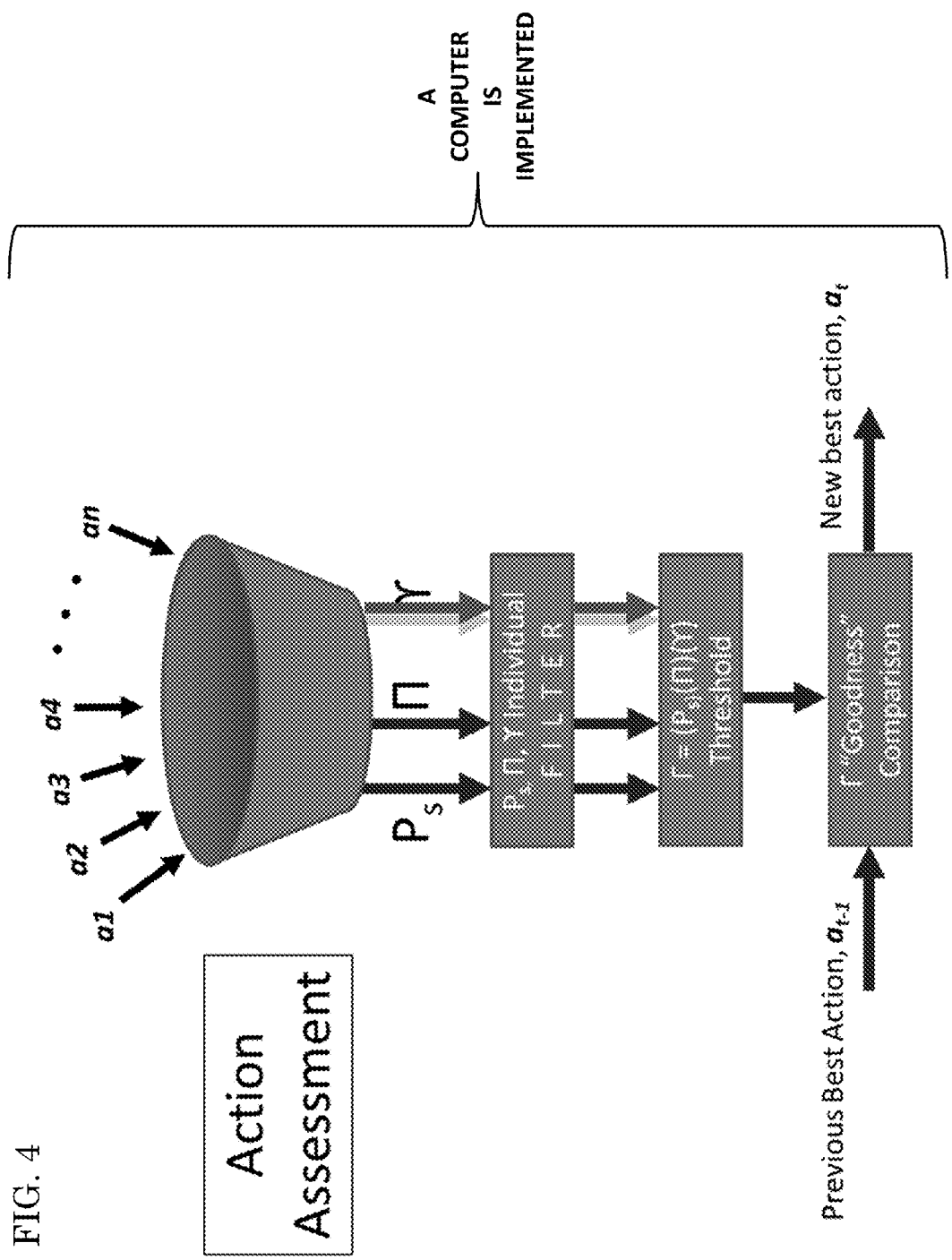
FIG. 4 is a diagram illustrating an example, in accordance with the present invention, of action assessment using probability, preference, and urgency.

Next, the action assessment function examines each ROE-generated course of action $(a_i)$ in order to score it in three primary ways. These scorings are individually normalized based on user criteria between 0 and 1. FIG. 4 shows an example of an action assessment process in accordance with the present invention. Each action is input into the process, and the corresponding values for Ps, Π, and Y are developed.

The first scoring factor is the estimated probability that the action will be fully successful given the current state represented in the model. This probability (Ps) will consider the estimated effectiveness of weapons, adversary capabilities, risk in carrying out the action, influence of required operator training, etc.

The second scoring factor is Π, which scores the commander's preference for a course of action. This preference for one course of action over another is independent of their probabilities for success (Ps) or their expected successful/unsuccessful outcomes. Instead, it incorporates a decision-maker's biases for/against an action for any reason, be it unit training, commander past-experience, and/or how an option potentially shapes future opportunities.

Finally, the third scoring factor is Y, the urgency to carry out the action. This is linked to the closing of a window of time to accomplish the task, linked to an impending shortage of resources required to carry out the action, and/or the expiration of an opportunity to act.

Still referring to FIG. 4, the next step is to eliminate the courses of action that are unacceptable to the decision-maker. This can be done by filtering out or retaining actions whose values for some or all of the variables (Ps, Π, and Y) fall outside one or more acceptable criteria. These elimination or retention filters could be applied to each individual variable or groups of variables in any mathematical or algorithmic way that effectively retains acceptable/appropriate actions while also eliminating unacceptable/inappropriate actions.

Next, by combining the three factors together, the action "goodness" (Γ) can be calculated for each of the remaining actions. That is, the magnitude of goodness Γ is determined for each action that passes through the filtering phase. The algorithm to combine Ps, Π, and Y into the Γ goodness factor can be as simple as straight multiplication, or a complex algorithm that also includes various grades or tiers of anticipated outcomes for each acceptable action. Thus generated is a list of goodness Γ scores respectively corresponding to the unremoved actions.

By taking the top rated goodness Γ score from the list, these potential actions can be compared with the action goodness from the previous time step to determine if a change of action should be taken (e.g. new orders given to units or subordinates). Note that it is also possible to compare the "currently best or highest Γ" action to estimated future values of Γ (for the same action) to determine if the commander should decide now to take the new action or if it is more valuable (higher Γ) to wait for a future time.

Objectives, Perceptions, Abilities, Limitations, and Strategies (OPALS)

The present invention models the tactical decision-making processes of individuals so as to account for a decision-maker's Objectives, Perceptions, Abilities, Limitations, and Strategies (referred to herein as "OPALS") over a time-evolving scenario or simulation. The present inventors conceived and developed OPALS as a unique methodology for: segregating or parsing an individual's components that influence decision-making; and, delineating the interdependencies and linkages between these components.

The present invention's OPALS construct establishes a taxonomy of actions, effects, and targets to aid in designing information operations. People make decisions in order to achieve specific objectives. The present invention provides for the instantiation of its OPALS construct into a synthetic simulation, explicitly for modeling human individual decision-making—particularly when multiple objectives compete for resources, the observed information streams are incomplete or conflicting, or when possible options contradict expectations. Inventive practice of OPALS can be embellished, expanded, or enhanced by accounting for decisions made by groups of individuals.

Figure 5:
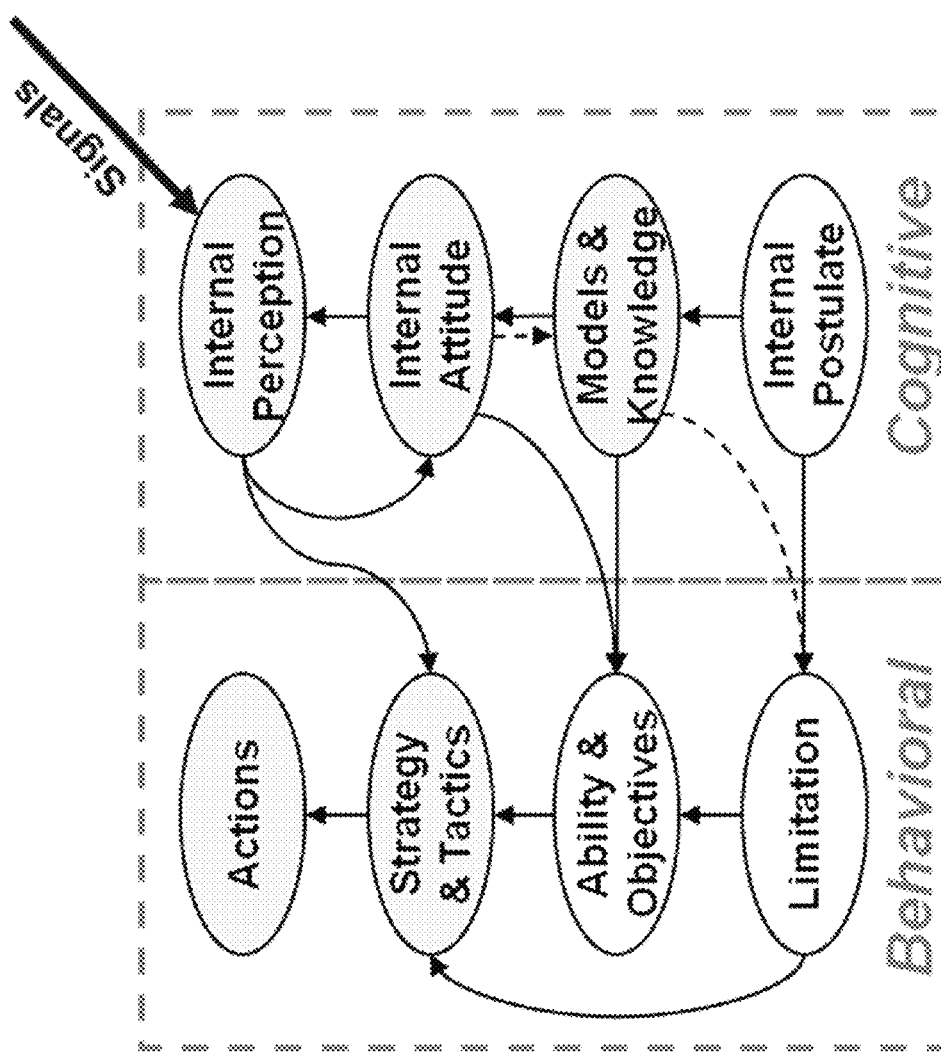
FIG. 5 is a diagram illustrating an example of application of the OPALS construct to modeling decision-making, in accordance with the present invention.

With reference to FIG. 5, the present invention accounts for the factors, causalities, and interrelations that weigh into an individual's decisions, both conscious and unconscious. These factors, causalities, and interrelations are often remarkably complex. More specifically, the present invention's OPALS construct takes into account an individual decision-maker's objectives, perceptions, abilities, limitations, and strategies. As used herein, the terms "Objectives," "Perceptions," "Abilities," "Limitations," and "Strategies" are defined as follows.

The term "Objectives" refers to the complete set of prioritized goals which are shaped by the individual's ideology. Objectives may include mutually exclusive or contradictory goals.

The term "Perceptions" refers to the individual's interpretation of the true states of one's self, others, and the environment, this interpretation is shaded by one's experiences, biases, beliefs, and culture.

The term "Abilities" refers to the full range of known/assumed capabilities of the individual to take action. This may differ from the individual's true abilities.

The term "Limitations" refers to the complete set of imposed constraints placed on the individual's potential courses of actions, including legal, moral, and authority/latitude restrictions.

The term "Strategies" refers to the means adopted by the individual to achieve the objectives, based on the individual's perceptions and abilities.

Consistency, Credibility, and Confidence

Figure 6:
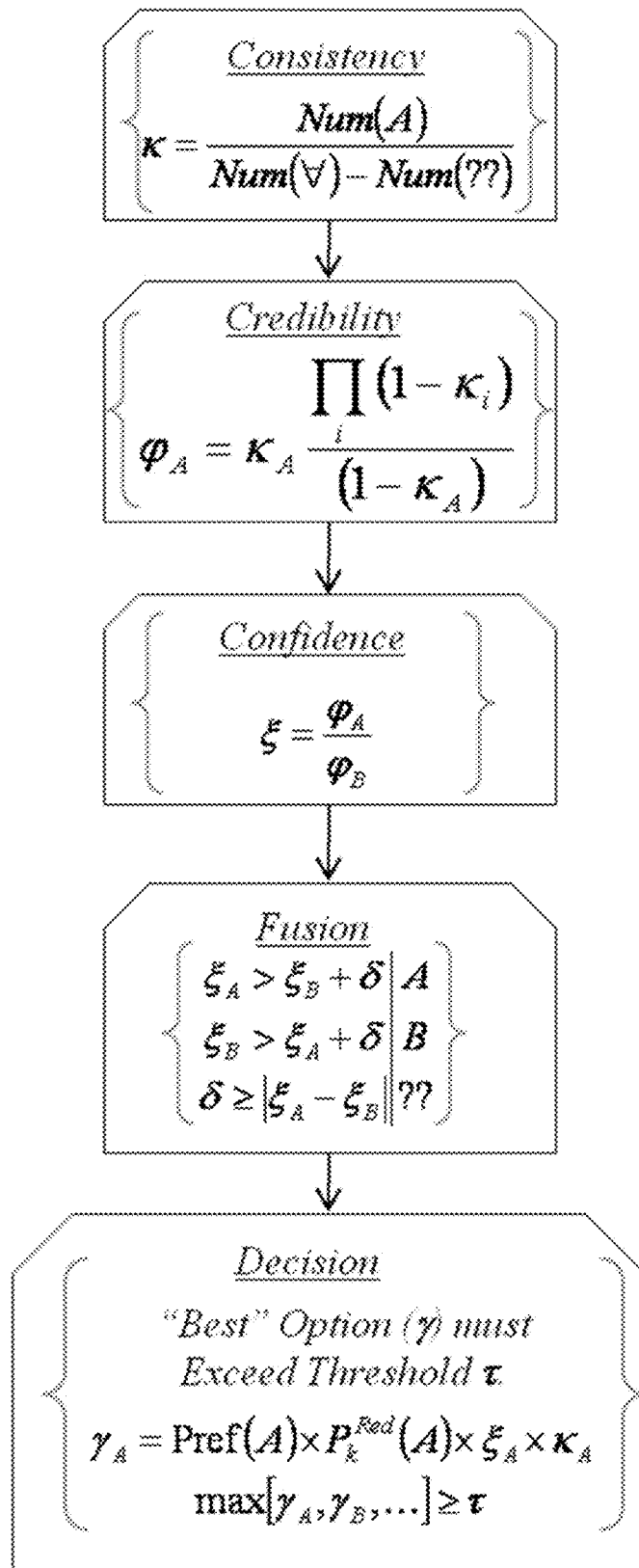
FIG. 6 is a diagram illustrating an example of implementation of consistency, credibility, and confidence algorithms for sequential decision-making modeling, in accordance with the present invention.

Reference now being made to FIG. 6, the present invention's Consistency, Credibility, and Confidence methodology serves to establish a quantitative model of human decision-making that can: evaluate inconsistent, incorrect, and false sequential reports of proposed subject classification; and, arrive at a viable classification of assignments (e.g., target identification). Among the advantages of the present invention's Consistency-Credibility-Confidence methodology are its computational efficiency, its ability to be "tuned" to match human decision-making, and its expandability.

The present invention's Consistency-Credibility-Confidence scheme assigns target identifications/classifications in a manner that mimics human decision-making and handles multiple, sequential information streams. The inventive Consistency-Credibility-Confidence methodology, discussed in greater detail hereinbelow, assumes the inventive OPALS construct for individual human decision-making.

First, the history of proposed/recommended classification assignments is evaluated for Consistency (κ). For instance, the consistency for an assignment "A" can simply be how many times was assignment A recommended vice other recommendations, excluding unknowns.

Next, the Credibility for potential assignment A ($\varphi_A$) is the consistency associated with identity A times the product of all of the inconsistencies (1−κ) for all of the otherpotential identities of the same subject/target, which is also equivalent to $$\kappa_A \prod_{i \neq A} (1 - \kappa_i).$$

Thus, credibility factors are built for all potential classifications of the target, and these range from 0 to 1.

The Confidence in assignment A is the ratio of the credibility for assignment A ($\varphi_A$) divided by the credibility for the second greatest current credibility factor (here assumed as B). Generally speaking, multiple information streams inform human decision-makers and aid in building their perception. The above procedure can be done for each individual information stream.

Often, though, the information streams will yield contradictory classification assignments, even with the above-described inventive approach. Exemplary practice of the present invention resolves this contradiction by considering the confidence factor from any pair of contractor information streams, and then assigning the classification associated with the greatest confidence factor—but only if that difference exceeds some (personality-driven) threshold value $\delta$.

However, if the confidence factors are closer than $\delta$, the decision-maker has insufficient confidence in either reporting source to differentiate the discrepancy. In the case of more than two information streams, the inventive method can be expanded in a variety of ways, including summing the confidence in all identical classification assignments.

The decision-maker's perception is now constructed. Based on the decision-makers perception, the value of any possible decision (e.g. attack target) is the product of the classification consistency, the confidence in that classification, the perceived probability of mission success ($P_k$) of each possible action against that perceived type of target, and the decision-maker's preference Pref(A) for that particular action against the perceived target.

Bias

Figure 7:
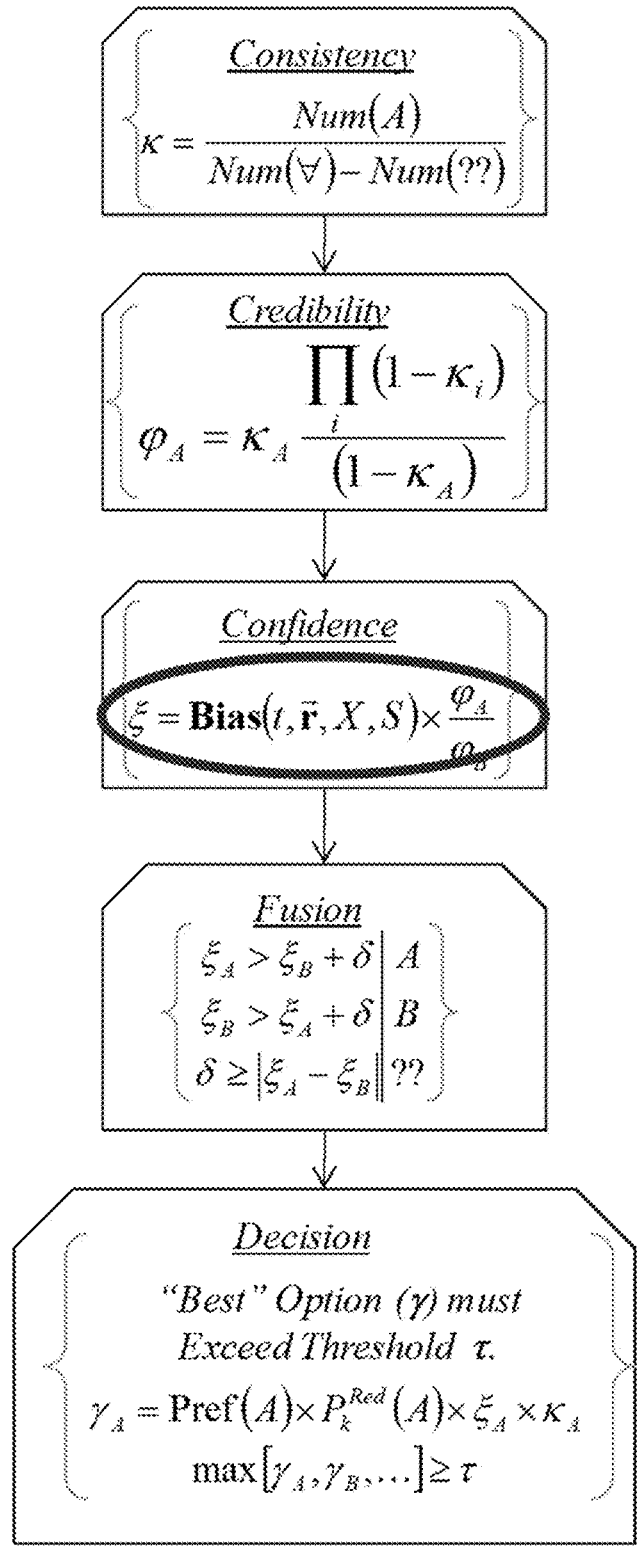
FIG. 7 is a diagram, similar to FIG. 6, illustrating an example of representation of bias and expectation in individual decision-making modeling, in accordance with the present invention.

With reference to FIG. 7, the present invention's Bias methodology establishes a quantitative model of human decision-making that can account for a wide range of decision-maker bias, including bias toward pre-existing expectations, bias toward/against information sources, or learned bias that evolves with experiences. The term "bias" is used herein in a broad sense to encompass components of both inclination and expectation.

The inventive bias approach (FIG. 7) assumes the inventive OPALS construct for individual human decision-making (FIG. 5), and largely assumes the inventive consistency-credibility-confidence algorithms for sequential decision-making modeling (FIG. 6). The present invention's bias method is similar to, but serves to enhance, the present invention's consistency-credibility-confidence method.

The inventive bias methodology introduces bias (e.g., inclination and expectation) into the inventive consistency-credibility-confidence methodology. In particular, the inventive bias differs from the inventive consistency-credibility-confidence insofar as modifying the decision-maker assigned confidence ($\xi$) regarding the decision-maker's interpretation of observations. This difference is reflected in the "Confidence" schematic box of FIG. 6 versus that of FIG. 7.

According to the inventive consistency-credibility-confidence method, the decision-maker's confidence in assignment A is the ratio of the credibility for assignment A ($\varphi_A$) divided by the credibility for the second greatest current credibility factor (here assumed as B). The inventive consistency-credibility-confidence method shown in FIG. 6 does not include any type of bias.

In contrast, as shown in FIG. 7, the inventive bias method introduces the factor Bias into the inventive consistency-credibility-confidence method. That is, the inventive bias method modifies the inventive consistency-credibility-confidence method so as to explicitly include decision-maker bias.

Furthermore, according to the inventive bias method, this decision-maker bias can represent spatial expectations by rendering the bias dependent on the location (r) and/or the source of information (S). Additionally or alternatively, bias can change over time (t), showing the effects of the decision-maker's experience with his/her sensor network. The present invention's bias factor can be information source dependent, and/or be expressed both spatially and temporally, and/or include classifier bias (X).

Vis-à-vis the inventive consistency-credibility-confidence method, the inventive bias method is advantageous in that it efficiently and explicitly represents a wide range of complex inclinations, expectations, and decision-maker criteria that can be "tuned" to a specific type of decision-maker, or potentially can be quantitatively linked with the effects of psychological operations.

Urgency

Figure 8:
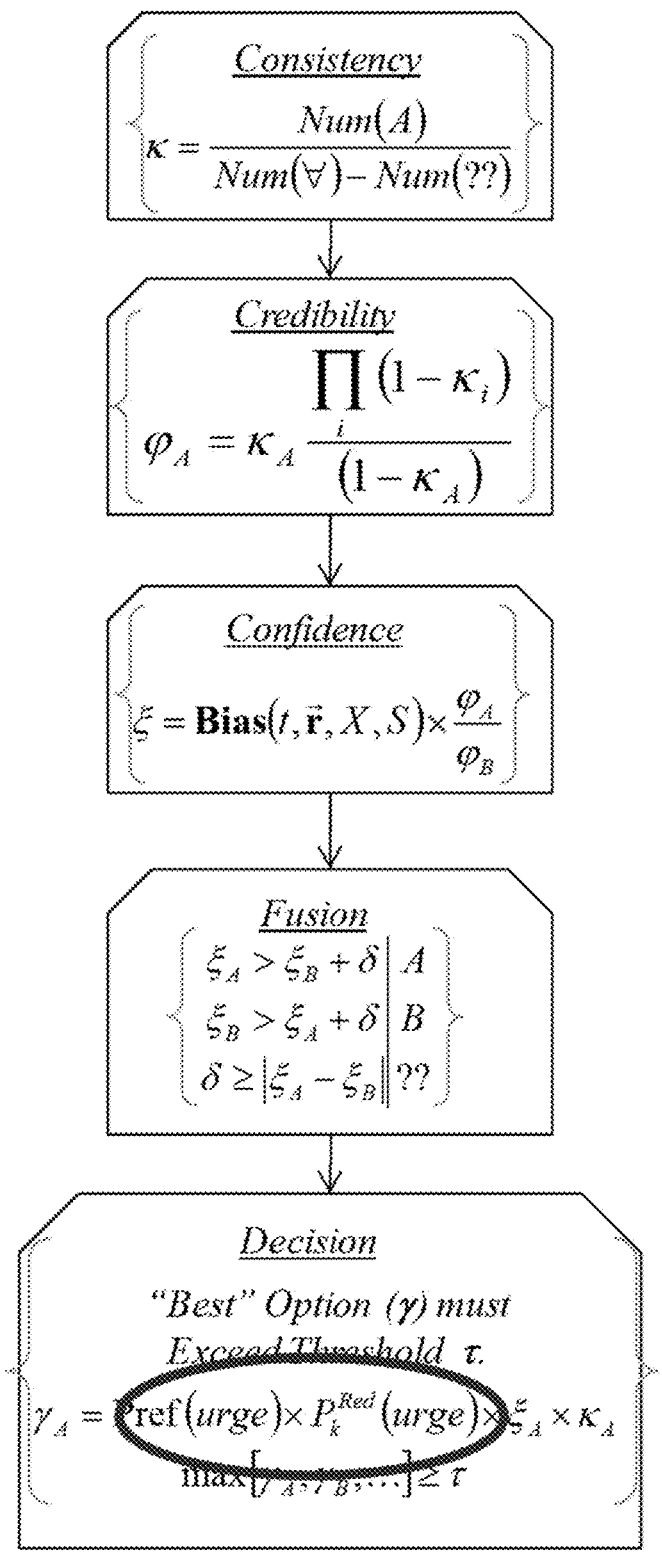
FIG. 8 is a diagram, similar to FIGS. 7 and 8, illustrating an example of incorporation of urgency in decision-making modeling, in accordance with the present invention.

Reference is now made to FIG. 8. The present invention, as it is frequently embodied, provides a decision-making modeling method that builds urgency into the decision-making model. In lieu of implementing if/then/else logic trees in human decision-making modeling, the present invention implements a scoring methodology that includes (i) the perceived credibility data, (ii) the commander's strategic preferences, (iii) the probability of action success, and, (iv) the urgency for taking a specific action—in order to decide how to proceed given various sensor inputs.

The present invention involves the assessment of potential actions in order to select the best option. More specifically, exemplary practice of this invention includes the influence of urgency on decision making in three forms, viz., temporal urgency, resource urgency, and opportunity urgency. The term "urgency" is broadly defined herein as a force or impulse that impels or constrains.

Temporal urgency concerns the available time to commit to an action before the effectiveness of the action is diminished in some way, such as the need to act before a certain time or to coordinate actions.

Resource urgency is a function of the consequences of scarcity of some significant but diminishing resource to the mission. This resource could be a combat system element, such as the depth of an arsenal, or it could be any other logistically limiting resource such as fuel, food, or people required to achieve a set probability of mission effectiveness.

Opportunity urgency projects future states and future probabilities of success and compares them to the present time. If the potential success in the future is expected to be less than in the present, then the urgency exists to act now to enjoy the maximum likelihood of success.

The methodology of the present invention is unique in its introduction of urgency in the modeling of human decision-making. The perceived urgency variable, Y, is comprised of the three aforementioned components/subcomponents, viz., (i) temporal urgency, (ii) resource urgency, and (iii) opportunity urgency. These three components/subcomponents can be combined in practically any mathematical or algorithmic manner described by the function/algorithm f, so long as $Y=f(Y1,Y2,Y3)\in[0, 1]$. This is expressed in the following equation:

$$Y=f(Y_1,Y_2,Y_3),$$

where: $Y_1$, $Y_2$, $Y_3 \in [0, 1]$; Y is overall urgency; $Y_1$ is temporal urgency; $Y_2$ is resource urgency; and, $Y_3$ is opportunity urgency.

Note that a straightforward approach to the inventive urgency methodology is to have $Y=\max(Y_1, Y_2, Y_3)$.

Another straightforward approach to the inventive urgency methodology is to have $\bar{Y}$=mean $(Y_1, Y_2, Y_3)$.

Note further that, when there is a strong urgency to act, the values $Y, Y_1, Y_2,$ and $Y_3$ will be close to 1. Conversely, when there is little urgency to act, the values $Y, Y_1, Y_2,$ and $Y_3$ will be closer to 0.

(i) Temporal Urgency, $Y_1$

Urgency values are calculated for scarcity of time $(Y_1)$. To show how actions become more urgent when the possibility of choosing them might vanish, the present invention can use a decaying function. For example, the function $Y_1 = e^{a(1-\tau)}$ can be used with great flexibility for the analyst.

Figure 9:
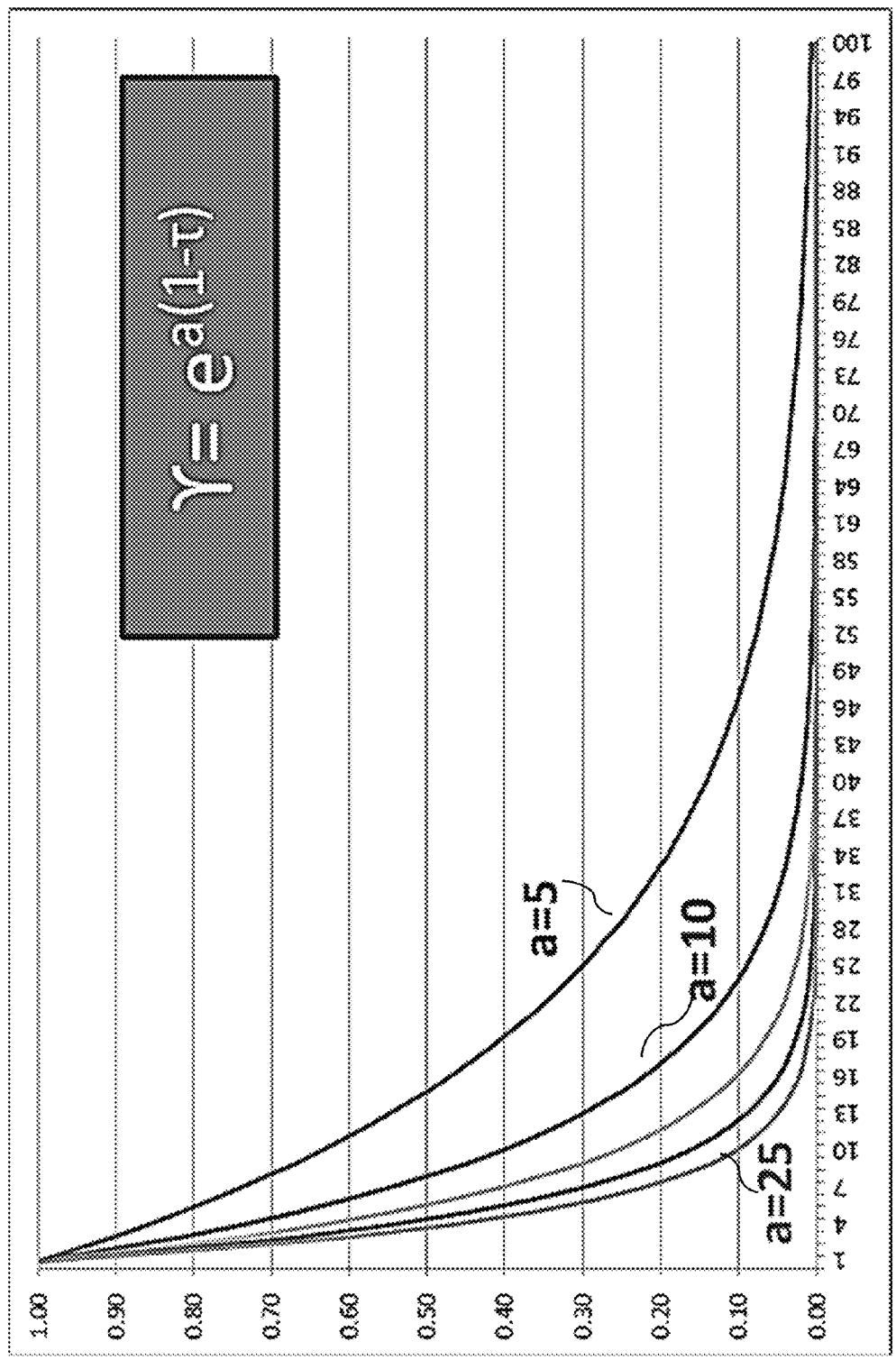
FIG. 9 is a graph illustrating an example of decaying urgency, with increase of remaining timesteps, in accordance with the present invention.

As shown in FIG. 9, the parameter, a, can vary from zero to 1000 and can provide a wide range of decay rates. Alternatively, if the objective is to synchronize an activity at a given time T, then the urgency function $Y_1$ may start low for time t<<T, rise quickly to 1 in the vicinity of T, and then fall towards 0 as t gets larger than T.

(ii) Resource Urgency, $Y_2$

As a commander draws down inventory of a limited resource, a consideration needs to be made in a mission model for the perceived increase in value of this resource. When resources are scarce, then the value of $Y_2$ will begin to increase towards 1. This increase in urgency could be a linear relationship with remaining resources, e.g., $Y_2$=1–% Left, where % Left=NumRemaining/Start-Inventory.

Or, this increase in urgency could be something more nuanced, e.g., $Y_2$=1–exp(–% Left), or other mathematical form. It is thus seen that when resources are plentiful, the urgency $Y_2$ will be closer to 0.

(iii) Opportunity Urgency, $Y_3$

The desirability of a course of action may be scored higher or lower by projecting/looking into the future, and estimating the goodness Γ of future states as a result of taking different actions. This allows consideration where the goodness of one action taken now, might outweigh an action (the same or different) taking some time in the future. As before, an action that would be better taken now (vice another action in the future) would have an opportunity urgency $Y_3$ close to 1, whereas an alternate action (e.g., to wait and take action later) would have a measurably lower associated opportunity urgency.

As shown in FIG. 8, the inventive urgency methodology assumes the afore-discussed inventive OPALS construct for individual human decision-making modeling. The inventive urgency methodology also largely assumes the afore-discussed inventive consistency, credibility, and confidence algorithms for sequential human decision-making modeling. In addition, the inventive urgency methodology largely assumes the afore-discussed inventive bias representation in individual human decision-making modeling.

The inventive urgency representation in individual decision-making modeling is similar to the inventive bias representation in individual decision-making modeling. Moreover, the inventive urgency representation in individual decision-making modeling is similar to the inventive consistency, credibility, and confidence algorithms for sequential human decision-making.

However, the present invention's urgency methodology differs from both the present invention's consistency-credibility-confidence methodology and the present invention's bias methodology, insofar as the present invention's urgency methodology modifies the decision-maker scoring (γ) associated with particular options. This difference is reflected in the respective "Decision" schematic boxes of FIG. 6, FIG. 7, and FIG. 8. The "Decision" schematic box is the same in FIG. 6 and in FIG. 7, but differs in FIG. 8.

The "Confidence" schematic box is shown in FIG. 8 to be the same as that shown in FIG. 7, but to differ from that shown in FIG. 6. Further, the "Decision" schematic box is shown in FIG. 8 to differ from that identically shown in FIG. 6 and FIG. 7.

FIG. 8 exemplifies inventive practice whereby both the inventive bias-expectation aspect and the inventive urgency aspect are incorporative changes vis-à-vis the inventive consistency-credibility-confidence construct shown in FIG. 6. Inventive practice is possible whereby the consistency-credibility-confidence construct of FIG. 6 is changed so as to include: the bias-expectation aspect but not the urgency aspect; or, the urgency aspect but not the bias-expectation aspect; or, both the bias-expectation aspect and the urgency aspect; or, neither the bias-expectation aspect nor the urgency aspect.

According to the present invention's consistency-credibility-confidence construct, the Pref value depends on the decision-maker's perception of the target (A), and ranges from 0 to ∞. The present invention's urgency construct "creates" urgency towards or against a specific decision by adjusting the Pref(A) value used in the calculation, specifically by replacing it with the urgency preference Pref(urge).

Still referring to FIG. 8, a simple approach by which the inventive urgency method can accomplish this is by having the urgency preference Pref(urge) be the ratio between: the non-urgent or relaxed preference, Pref(A); and, the preference associated with the anticipated alternate or future configuration, Pref(alt).

$$Pref(urg) = \left[\frac{Pref(A)}{Pref(alt)}\right]^N$$

Similarly, the anticipated probability of successful outcome $P_k$ should also be adjusted within the calculations set forth in FIG. 8:

$$P_k(urg) = \frac{P_k(A)}{P_k(alt)}$$

Inventive urgency could represent anticipation of an impending change. For instance, if the target will be hardened in the future, then Pref(alt)<Pref(A) encourages action against A at the decision point. On the other hand, if the target will be weakened in the future, then Pref(alt)>Pref(A) yields a reluctance to decide towards action against A at that moment.

Other algorithms can be used in an inventive urgency construct, for instance: an algorithm that includes complex relationships between Pref(alt) and Pref(A); and/or, an algorithm that includes time dependency or history; and/or, an algorithm that includes multiple options under consideration, e.g., explicit statement of Pref(B) within the Pref (urge) equation.

Figure 10:
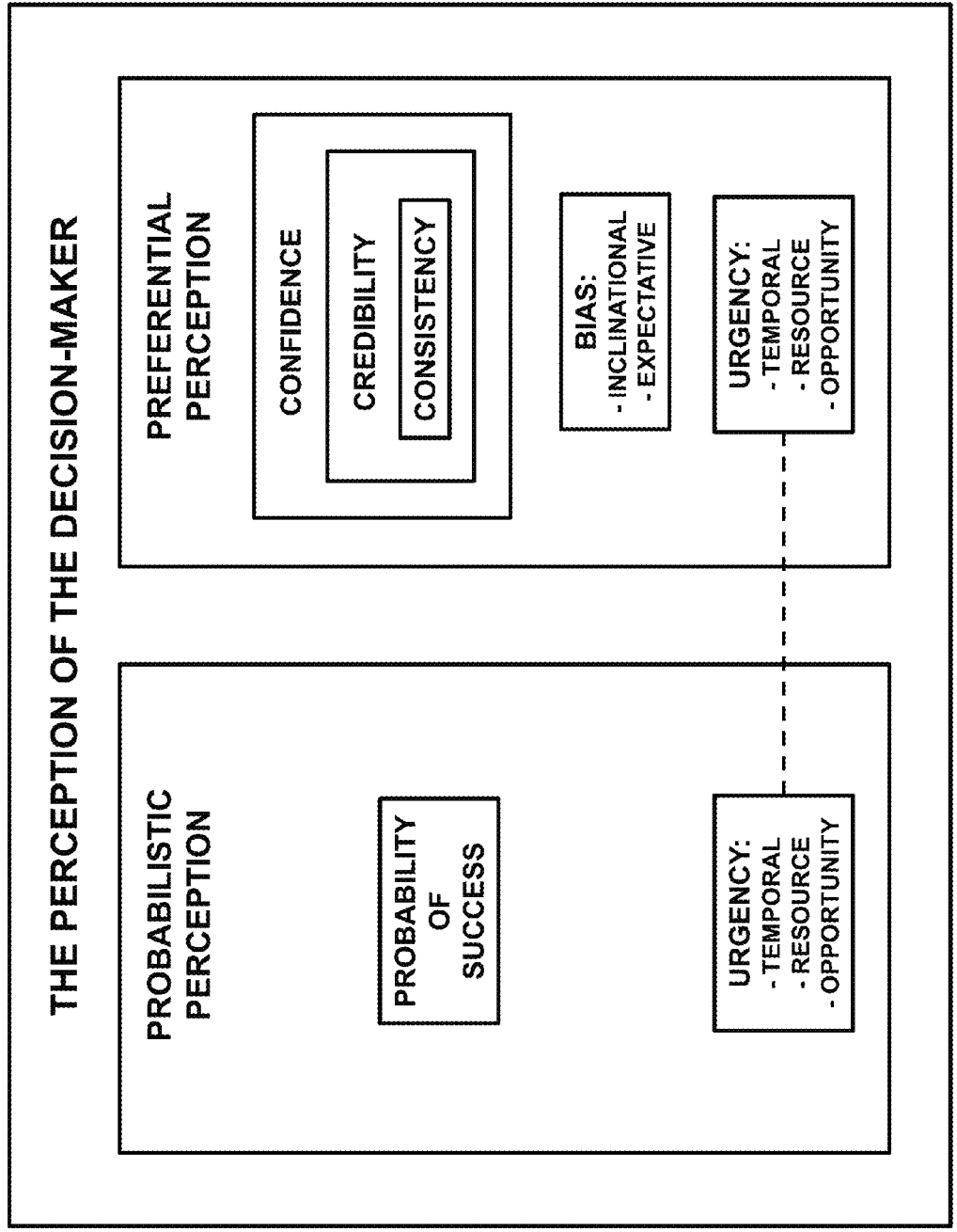
FIG. 10 is a schematic illustrating an example, in accordance with the present invention, of a comprehensive system of a decision-maker's perception of his/her options for taking potential actions.

FIG. 10 illustrates an inventive example of a comprehensive system of perceptual elements of human decision-making. The decision-maker's perception is dichotomized as "probabilistic" and "preferential." The probabilistic perception of the decision-maker goes more to his/her conscious perception regarding the prospects of success of a given potential action. The preferential perception of the decision-maker goes more to his/her subconscious perception as it influences his/her conscious perception regarding the prospects of success of a given potential action. Probabilistic perception is rational, logical, deliberative, and analytical; preferential perception is intuitive, spontaneous, instinctual, and felt.

Subjectivities such as consistency, credibility, confidence, bias, and urgency are manifest in preferential perceptual processes. Bias is subcategorized as inclinational bias and expectative bias. Urgency is subcategorized as temporal urgency, resource urgency, and opportunity urgency. Both preferential perception and probabilistic perception are influenced by urgency. For instance, a decision-maker may feel a sense of urgency and may logically weigh its consequences.

By way of example, an inventive apparatus can include a computer and plural electromagnetic sensing systems, including at least one radar system and at least one high frequency direction-finding (HFDF) system. Each electromagnetic sensing system performs sensing in relation to a target such as a ship or an aircraft. The radar systems each have the potential to determine the location of the target (e.g., ship) within its field of regard. Each HFDF system is capable of sensing, within its field of regard, the radio frequency emissions of the ship using its radio or search radar. The HFDF operator can determine the relative bearing of any sensed emissions, and can potentially determine the identification of the source ship. Note that the likelihood of an operator correctly determining the identity of a ship depends strongly on the operational mode of the source ship. Generally speaking, the radar and the HFDF will each define a probability-of-detection curve characterized by decreasing probability of detection with increasing range.

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

What is claimed is:

1. A computer-implemented method for making a decision in a military environment in accordance with sensory data, wherein the method is performed iteratively in separate time-steps, the method comprising:

implementing a plurality of electromagnetic sensors for continually performing electromagnetic sensing in relation to a target, said plurality of electromagnetic sensors including at least one radar sensor and at least one high frequency direction finder, each said high frequency direction finder being capable of sensing electromagnetic signals emitted by said target, each said electromagnetic sensor being capable of transmitting a sensory report;

receiving a plurality of respective data streams over time in separate time-steps from said plurality of electromagnetic sensors, said plurality of respective data streams containing information pertaining at least to location and identification of said target, each said data stream received from said radar sensor containing information pertaining at least to location of said target, each said data stream received from said high frequency direction finder containing information pertaining at least to identification of said target, each said data stream including a sequence of said sensory reports transmitted by a said electromagnetic sensor over time in said separate time-steps, wherein each said electromagnetic sensor transmits said sequence of said sensor reports over time in said separate time-steps, and wherein said sensory reports received from said plurality of electromagnetic sensors in a current said time-step are transmitted by said plurality of electromagnetic sensors more recently than are said sensory reports received from said plurality of electromagnetic sensors in a previous said time-step;

associating a confidence estimate with said sequence of said sensory reports received over time from each said electromagnetic sensor, wherein said associating of said confidence estimate includes consideration of a consistency of said sequence of said sensory reports received over time from said electromagnetic sensor;

producing a data fusion of the received said sensory reports and the associated said confidence estimates, said data fusion including a summative sensory report and a confidence level, wherein said confidence level includes consideration of the respective said consistencies of said sequences of said sensory reports received over time from said at least one radar sensor and said at least one high frequency direction finder;

determining a plurality of permissible actions to be taken with respect to said target, said permissible actions to be decided upon by a decision-maker, wherein said determining of said permissible actions is based on said data fusion and includes applying rules of engagement to said data fusion;

scoring each said permissible action, said scoring of each said permissible action including considering a probability of success, a preference, and an urgency, said probability of success being a probability of success of said permissible action as perceived by said decision-maker, said preference being a preference of said decision-maker with respect to said permissible action, said urgency being an urgency to perform said permissible action as perceived by said decision-maker, said preference including a bias of said decision-maker with respect to said permissible action, each said permissible action having three score values, said three score values being a first score value, a second score value, and a third score value, said first score value representing said probability of success, said second score value representing said preference, said third score value representing said urgency;

establishing a threshold value of acceptability with respect to each of said three score values;

filtering out each said permissible action for which at least one of said three score values is unacceptable based on a said threshold value of acceptability, said filtering out resulting in a plurality of remaining said permissible actions;

calculating an action goodness magnitude for each of the remaining said permissible actions, wherein: said calculating of said action goodness magnitude takes into consideration said probability of success, said preference, and said urgency; said urgency includes a temporal said urgency, a resource said urgency, and an opportunity said urgency; the temporal said urgency relates to available time to commit to a said permissible action before effectiveness of said permissible action is diminished; the resource said urgency relates to consequence of scarcity of a diminishing resource; the opportunity said urgency relates to comparison between future said probability of success and present said probability of success; said calculating of said action goodness magnitude includes calculating an overall said urgency, the overall said urgency taking into consideration the temporal said urgency, the resource said urgency, and the opportunity said urgency;

selecting a best said permissible action from among the remaining said permissible actions, wherein said selecting of a best said permissible action is based on the respective goodness magnitudes of at least two remaining said permissible actions.

2. The computer-implemented method of claim 1, wherein the method further comprises:

comparing a best said permissible action selected in a current said time-step to a best said permissible action selected in a previous said time-step, wherein said comparing of the best said permissible action selected in the current said time-step to the best said permissible action selected in a previous said time-step includes comparing the respective goodness magnitudes of the best said permissible action selected in the current said time-step and the best said permissible action selected in the previous said time-step;

determining whether to sustain the course of action that comports with the best said permissible action selected in the previous said time-step, or to change the course of action to comport with the best said permissible action selected in the current said time-step.

3. An apparatus comprising a plurality of electromagnetic sensors and a computer, said plurality of electromagnetic sensors being implemented for continually performing electromagnetic sensing in relation to a target, said plurality of electromagnetic sensors including at least one radar sensor and at least one high frequency direction finder, each said high frequency direction finder being capable of sensing electromagnetic signals emitted by said target, each said electromagnetic sensor being capable of transmitting a sensory report, said computer having computer code characterized by computer program logic for enabling said computer to model human decision-making in a military environment in accordance with said sensory reports, wherein said modeling is performed iteratively in separate time-steps, said computer code being executable by said computer so that, in accordance with said computer program logic, said computer performs acts including:

receiving respective data streams over time in separate time-steps from a plurality of electromagnetic sensors, said plurality of data streams containing information pertaining at least to location and identification of said target, each said data stream received from said radar sensor containing information pertaining at least to location of said target, each said data stream received from said high frequency direction finder containing information pertaining at least to identification of said target, each said data stream including a sequence of said sensory reports transmitted by a said electromagnetic sensor over time in said separate time-steps, wherein each said electromagnetic sensor transmits said sequence of said sensor reports over time in said separate time-steps, and wherein said sensory reports received in a current said time-step are transmitted by said plurality of electromagnetic sensors more recently than are said sensory reports received in a previous said time-step;

associating a confidence estimate with said sequence of said sensory reports received over time from each said electromagnetic sensor, wherein said associating of said confidence estimate includes consideration of a consistency of said sequence of said sensory reports received over time from said electromagnetic sensor;

producing a data fusion of the received said sensory reports and the associated said confidence estimates, said data fusion including a summative sensory report and a confidence level, wherein said confidence level includes consideration of the respective said consistencies of said sequences of said sensory reports received over time from said at least one radar sensor and said at least one high frequency direction finder;

determining a plurality of permissible actions to be taken with respect to said target, said permissible actions to be decided upon by a decision-maker, wherein said determining of said permissible actions is based on said data fusion and includes applying rules of engagement to said data fusion;

scoring each said permissible action, said scoring of each said permissible action including considering a probability of success, a preference, and an urgency, said probability of success being a probability of success of said permissible action as perceived by said decision-maker, said preference being a preference of said decision-maker with respect to said permissible action, said urgency being an urgency to perform said permissible action as perceived by said decision-maker, said preference including a bias of said decision-maker with respect to said permissible action, each said permissible action having three score values, said three score values being a first score value, a second score value, and a third score value, said first score value representing said probability of success, said second score value representing said preference, said third score value representing said urgency;

establishing a threshold value of acceptability with respect to each of said three score values;

filtering out each said permissible action for which at least one of said three score values is unacceptable based on a said threshold value of acceptability, said filtering out resulting in a plurality of remaining said permissible actions;

calculating an action goodness magnitude for each of the remaining said permissible actions, wherein: said calculating of said action goodness magnitude takes into consideration said probability of success, said preference, and said urgency; said urgency includes a temporal said urgency, a resource said urgency, and an opportunity said urgency; the temporal said urgency relates to available time to commit to a said permissible action before effectiveness of said permissible action is diminished; the resource said urgency relates to consequence of scarcity of a diminishing resource; the opportunity said urgency relates to comparison between future said probability of success and present said probability of success; said calculating of said action goodness magnitude includes calculating an overall said urgency, the overall said urgency taking into consideration the temporal said urgency, the resource said urgency, and the opportunity said urgency;

selecting a best said permissible action from among the remaining said permissible actions, wherein said selecting of a best said permissible action is based on the respective goodness magnitudes of at least two remaining said permissible actions.

4. The apparatus of claim 3, wherein:
said computer code is executable by said computer so that, in accordance with said computer program logic, said computer performs acts further including:
comparing a best said permissible action selected in a current said time-step to a best said permissible action selected in a previous said time-step, wherein said comparing of the best said permissible action selected in the current said time-step to the best said permissible action selected in a previous said time-step includes comparing the respective goodness magnitudes of the best said permissible action selected in the current said time-step to the best said permissible action selected in a previous said time-step;
based on said comparing of the best said permissible action selected in the current said time-step to the best said permissible action selected in a previous said time-step, determining whether to: sustain the course of action that comports with the best said permissible action selected in the previous said time-step; or change the course of action to comport with the best said permissible action selected in the current said time-step.

5. A computer program product for modeling human decision-making in a military environment in accordance with sensory data, wherein said modeling is performed iteratively in separate time-steps, the computer program product comprising a non-transitory computer-readable storage medium having computer-readable program code portions stored therein for execution by a computer, the computer-readable program code portions including:
a first executable program code portion, for receiving respective data streams over time in separate time-steps from a plurality of electromagnetic sensors, said plurality of data streams containing information pertaining at least to location and identification of a target, each said data stream received from said radar sensor containing information pertaining at least to location of said target, each said data stream received from said high frequency direction finder containing information pertaining at least to identification of said target, each said data stream including a sequence of sensory reports transmitted by and received from an electromagnetic sensor over time in said separate time-steps, each said electromagnetic sensor continually performing electromagnetic sensing in relation to said target, said plurality of electromagnetic sensors including at least one radar sensor and at least one high frequency direction finder, each said high frequency direction finder sensing electromagnetic signals emitted by said target, each said electromagnetic sensor transmitting a said sensory report, wherein each said electromagnetic sensor transmits said sequence of said sensor reports over time in said separate time-steps, and wherein said sensory reports received in a current said time-step are transmitted by said plurality of electromagnetic sensors more recently than are said sensory reports received in a previous said time-step;
a second executable program code portion, for associating a confidence estimate with said sequence of said sensory reports received over time from each said electromagnetic sensor, wherein said associating of said confidence estimate includes consideration of a consistency of said sequence of said sensory reports received over time from said electromagnetic sensor;
a third executable program code portion, for producing a data fusion of the received said sensory reports and the associated said confidence estimates, said data fusion including a summative sensory report and a confidence level, wherein said confidence level includes consideration of the respective said consistencies of said sequences of said sensory reports received over time from said at least one radar sensor and said at least one high frequency direction finder;
a fourth executable program code portion, for determining a plurality of permissible actions to be taken with respect to said target, said permissible actions to be decided upon by a decision-maker, wherein said determining of said permissible actions is based on said data fusion and includes applying rules of engagement to said data fusion;
a fifth executable program code portion, for scoring each said permissible action, said scoring of each said permissible action including considering a probability of success, a preference, and an urgency, said probability of success being a probability of success of said permissible action as perceived by said decision-maker, said preference being a preference of said decision-maker with respect to said permissible action, said urgency being an urgency to perform said permissible action as perceived by said decision-maker, said preference including a bias of said decision-maker with respect to said permissible action, each said permissible action having three score values, said three score values being a first score value, a second score value, and a third score value, said first score value representing said probability of success, said second score value representing said preference, said third score value representing said urgency;
a sixth executable program code portion, for establishing a threshold value of acceptability with respect to each of said three score values;
a seventh executable program code portion, for filtering out each said permissible action for which at least one of said three score values is unacceptable based on a said threshold value of acceptability, said filtering out resulting in a plurality of remaining said permissible actions;
an eighth executable program code portion, for calculating an action goodness magnitude for each of the remaining said permissible actions, wherein: said calculating of said action goodness magnitude takes into consideration said probability of success, said preference, and said urgency; said urgency includes a temporal said urgency, a resource said urgency, and an opportunity said urgency; the temporal said urgency relates to available time to commit to a said permissible action before effectiveness of said permissible action is diminished; the resource said urgency relates to consequence of scarcity of a diminishing resource; the opportunity said urgency relates to comparison between future said probability of success and present said probability of success; said calculating of said action goodness magnitude includes calculating an overall said urgency, the overall said urgency taking into consideration the temporal said urgency, the resource said urgency, and the opportunity said urgency;
a ninth executable program code portion, for selecting a best said permissible action from among the remaining said permissible actions, wherein said selecting of a best said permissible action is based on the respective goodness magnitudes of at least two remaining said permissible actions.

6. The computer program product of claim 5, wherein the computer-readable program code portions further include:

a tenth executable program code portion, for comparing a best said permissible action selected in a current said time-step to a best said permissible action selected in a previous said time-step, wherein said comparing of the best said permissible action selected in the current said time-step to the best said permissible action selected in a previous said time-step includes comparing the respective goodness magnitudes of the best said permissible action selected in the current said time-step to the best said permissible action selected in a previous said time-step;

an eleventh executable program code portion, for, based on said comparing of the best said permissible action selected in the current said time-step to the best said permissible action selected in a previous said time-step, determining whether to: sustain the course of action that comports with the best said permissible action selected in the previous said time-step; or change the course of action to comport with the best said permissible action selected in the current said time-step.

* * * * *